Nov. 12, 1929.   F. POWERS ET AL   1,735,091
DIAMOND CORE DRILL
Filed April 5, 1926   2 Sheets-Sheet 1

INVENTORS
FRED POWERS
JOHN W. TOLLAND
By Edward E. Longan
ATTORNEY

Nov. 12, 1929.  F. POWERS ET AL  1,735,091
DIAMOND CORE DRILL
Filed April 5, 1926   2 Sheets-Sheet 2

INVENTOR
FRED POWERS
JOHN W. TOLLAND
BY Edward E. Longan
ATTORNEY

Patented Nov. 12, 1929

1,735,091

UNITED STATES PATENT OFFICE

FRED POWERS, OF NORMAN, OKLAHOMA, AND JOHN W. TOLLAND, OF ST. LOUIS, MISSOURI; SAID TOLLAND ASSIGNOR TO C. F. CAMP COMPANY, OF TULSA, OKLAHOMA, A CORPORATION OF OKLAHOMA

DIAMOND CORE DRILL

Application filed April 5, 1926. Serial No. 99,770.

Our invention relates to improvements in dimond core drills, and has for its primary object a dimond core drill in which the various parts can be driven at different speeds from a single source of power.

A further object is to construct a diamond core drill having a single constant speed source of power and which is so arranged that the various parts, as the sludge pump, hydraulic feed pump and drill spindle, can be driven at different and varying speeds according to the requirements of the drilling done. Heretofore all diamond drills were operated by steam power and a separate steam engine was used to drive these various parts because at times it was necessary to run the feed pump slowly, the sludge pump and drill spindle at relatively high speeds, and at other times it was desired to speed up the feed pump alone or to speed up either the sludge pump or drill spindle. For this reason it has been heretofore impossible to use a constant speed single source of power, such as a gasoline engine or an electric motor on account of the necessity of frequently changing the speed of the parts enumerated.

Figure 1:
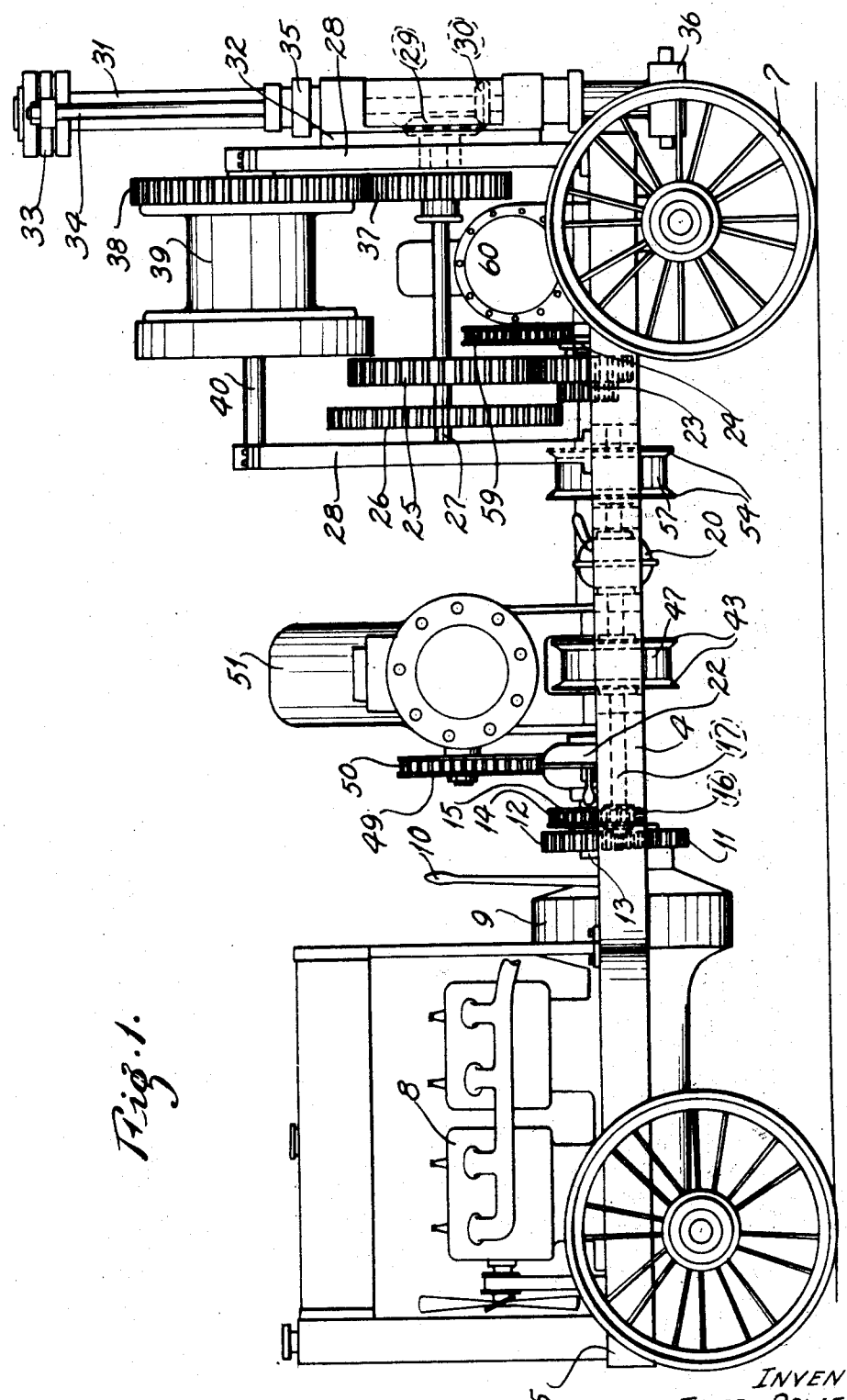
Fig. 1 is a side elevation of our device.
Figure 2:
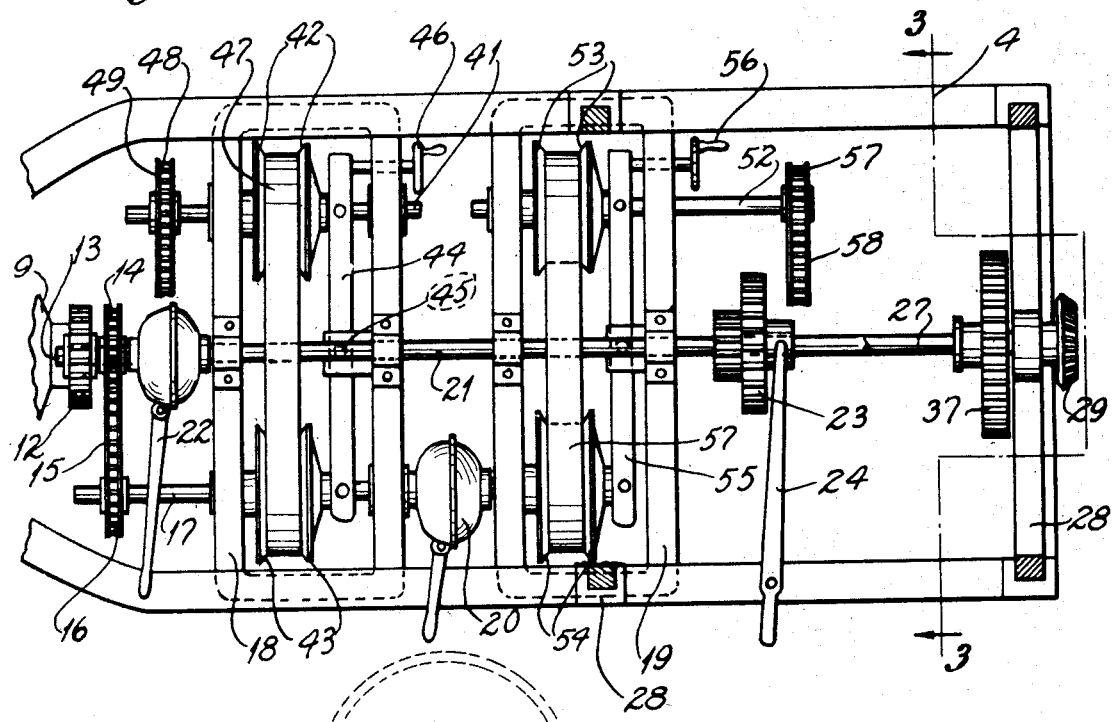
Fig. 2 is a top plan view with the forward portion broken away.
Figure 3:
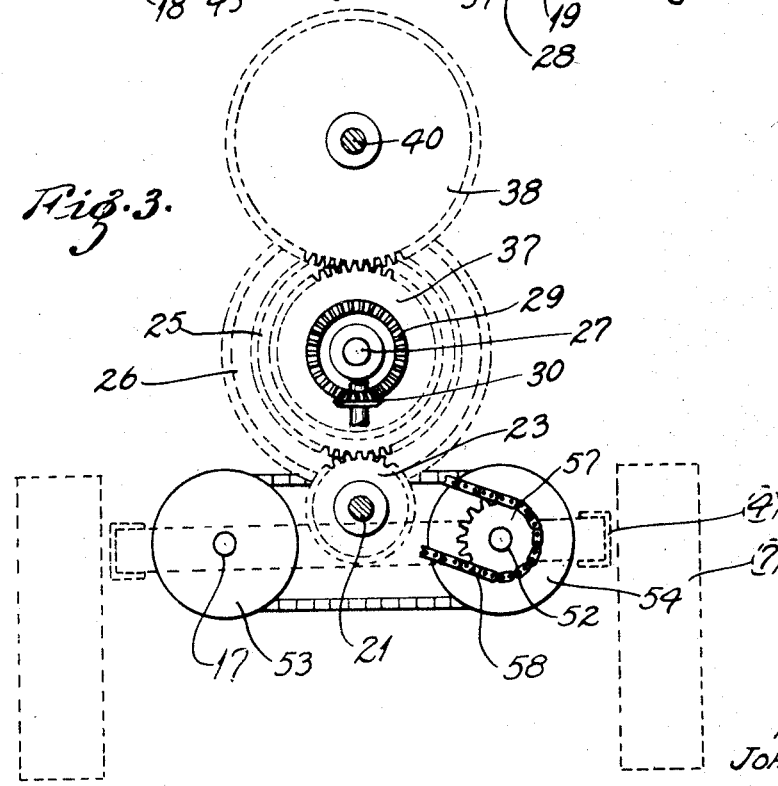
Fig. 3 is a sectional view taken on the line 3—3 of Fig. 2.

In the construction of our device we employ a frame 4 which is narrowed at its front end 5. This frame is mounted on wheels 6 and 7 so that it can be readily transported. The wheels 6 are mounted on an axle which is pivotally secured to the frame so that these wheels can pivot. This construction is similar to the construction of the front wheels on a wagon and, therefore, is not described in detail.

Carried by the forward end of the frame is a gasoline motor 8, the crankshaft of which carries the usual clutch 9, which is operated by means of a lever 10. By the use of this clutch the engine or power plant can be entirely disconnected from the remainder of the driving mechanism. Mounted on the driving shaft of the engine is a gear 11 which meshes with the gear 12. The gear 12 mounted on a shaft 13 which extends toward the rear of the machine. Mounted on the shaft 13 is a sprocket wheel 14 over which a chain 15 passes. The chain 15 also passes around a sprocket 16 which is mounted on a shaft 17. The shaft 17 extends rearwardly and is mounted in frames 18 and 19, which frames carry variable speed transmissions as will be hereinafter described. The shaft 17 is provided with a clutch 20 located between the frames 18 and 19 so that that portion of the shaft 17 in the frame 19 can be disconnected and the variable speed transmission carried by the frame 19 stopped.

Extending rearwardly from the shaft 13 is a shaft 21 which is connected to the shaft 13 by means of a clutch 22. This clutch permits the shaft 21 to be placed in and out of operation as desired. Slidably mounted on the shaft 21 is a step gear 23 which is operated by means of a lever 24. This gear can be moved longitudinally on the shaft so as to engage either the gears 25 or 26, which are mounted on the shaft 27. This shaft is carried by supports 28 and has secured thereto a bevel gear 29 which meshes with a bevel gear 30 slidably mounted on the speed spindle 31. The speed spindle is mounted in a gate 32 and is provided on its upper end with a thrust collar 33 through which speed rods 34 are secured, the opposite ends of these speed rods extend into hydraulic cylinders 35 by means of which the spindle can be raised and lowered. The lower end of the spindle is provided with a chuck 36 by means of which the hollow drill rod is secured to the feed spindle. Slidably mounted on the shaft 27 is a gear 37 which can be moved longitudinally so as to mesh with the gear 38 carried by the hoisting drum 39. This drum is mounted on a shaft 40 carried by the supports 28. Mounted in the frame 18 is a shaft 41 which is parallel to the shaft 17 and on which are slidably mounted conical disks 42. Mounted on the shaft 17 are conical disks 43. These disks are connected to a lever 44 which is pivoted intermediate its ends as at 45. Secured to one end of the lever 44 is a handwheel 46 by means of which the lever is rocked on its pivot and when the lever has one end pulled outward, the other end is moved inward so that when the handwheel is operated to separate the disks 42, the disks 43 will be moved together, thus causing the V belt 47 to travel upward and downward on the inclined faces of the disks thus varying the speed at which the disks 42 and shaft 41 are driven. Mounted on the shaft 41 is a sprocket 48 around which a chain 49 passes. This chain passes around a sprocket 50 and by means of this the sludge pump 51 is driven. The frame 19 has a shaft 52 mounted therein on which conical disks 53 are slidably mounted and on the shaft 17 are conical disks 54. These disks are controlled by means of a lever 55 and handwheel 56 and operate in the same manner as the disks 42 and 43. A V belt 57 connects the disks 53 and 54. Mounted on the shaft 52 is a sprocket 57 around which the chain 58 passes. This chain passes around a sprocket 59 and by means of this the feed pump 60 is driven. It will be noted by the construction just described that the speed of the feed pump or the speed of the sludge pump can be varied at any time while the device is in operation and their speed can be made entirely independent of the engine or power unit as it is possible to slow down the power unit and increase the speed of the pumps by merely operating the handwheels 46 and 56 in such a manner as to force the disks 43 and 54 together and separate the disks 42 and 53, or if it is desired to speed up the engine and reduce the speed of the pumps, the disks 43 and 54 are separated and the disks 42 and 53 brought together. It is also possible to vary the speed of the drill spindle by shifting the step gear 23 as, when this gear is in mesh with the gear 25, the feed spindle will be driven faster than when it is in mesh with the gear 26.

The operation of our device is as follows: After the device has been placed in the proper position, the engine 8 is started, the pumps 51 and 60 have their intake ends connected to a suitable source of water supply, the clutch 10 engaged, and the feed pump 60 placed in operation. Water from this pump is then admitted to the feed cylinders 35 and the spindle 31 raised. A drill rod having a cutting bit placed in position in the spindle and tightened by means of the chuck. The step gear 23 is then shifted so as to bring it in mesh with either the gear 25 or 26, the gear 37 slipped out of engagement with the gear 38, and the device is ready for operation. The sludge pump is started and its speed regulated to supply the proper amount of water. The speed of the feed pump is also regulated so as to supply the proper feed depending on the kind of material the drill is penetrating. The drill is rotated by means of the bevel gears 29 and 30 and fed downward the full stroke of the hydraulic feed cylinders 35. When this depth has been reached, the rotation of the drill is stopped, the chuck 36 loosened and the water pressure from the pump 60 reversed in the feed cylinders raising the feed spindle. The chuck is then again tightened, the flow of water reversed in the feed cylinders and the drill fed downward again. This is continued until the length of drill rod has been used up. The chuck is then again disconnected and a new section of drill rod secured in position. This section of drill rod is hoisted by means of a cable and derrick not shown, the cable passing around the drum 39. The drum is placed in operation by shifting the gear 37 so that it meshes with the gear 38. The section of drill rod is hoisted in this manner sufficiently high to permit it to be inserted through the spindle 31 and after being screwed into the section of rod already in the ground, the chuck is tightened and the operation repeated.

When it is desired to withdraw the drill from the ground, it is first fed down sufficiently far so that upon the disengagement of the chuck and the raising of the feed spindle, the chuck will be above the upper end of the drill rod. The chuck and feed spindle are then moved away from the drill rod and the hoisting cable attached to the rod and the rod pulled up as far as the derrick will permit. The rod is then clamped immediately above the ground and the upper section of drill rod removed. The cable is then disengaged from the removed portion of drill rod and secured to the remaining portion, which is then hoisted as previously described. This operation is continued until the entire drill rod and bit have been removed from the hole. It is to be understood, of course, that during the drilling operation the sludge pump is at work forcing water down through the drill rod so as to remove the cuttings of the bit. It very frequently happens during the operation of the device that extremely hard rock is encountered necessitating a slow feed with a relatively high drill speed. This is accomplished by operating the handwheel 56 in such a manner as to bring the conical disks 53 together and separate disks 54 thus giving the effect of driving from a small pulley to a large one. This can be done without changing the speed of the engine and consequently the speed of the drill. The same method can be followed to decrease the speed of the sludge pump. When very soft material is to be drilled through either earth, sandstone or the like, and a rapid feed is required, the conical disks 53 are separated bringing the disks 54 together thus increasing the speed of the feed pump and consequently the feed. The speed of the drill, that is, its rotation, is controlled in two ways, either by shifting the step gear 23 so that it meshes with the gear 25 in which case the speed will be increased without changing the speed of the engine and if shifted to mesh with the gear 26, the speed will be decreased. In addition to this the speed of the drill can be governed by throttling down the engine itself although this is not very frequently done because a gasoline engine throttled down to low loses its power. It will thus be seen that our device can be operated by a single power unit or engine and the speed of the sludge pump, the feed pump, and the drill be controlled independently of each other and that the speed of the sludge pump and feed pump can be changed and regulated very quickly without interfering in any way with the operation of the device or even halting its operation during such changes.

The particular advantage of our device is that it is not necessary to carry bulky fuel, such as coal or wood, as is the case where steam power is employed. Furthermore it does not take a high salaried engineer to operate the device because there are no steam engines to take care of nor does it require the services of a fireman to keep up the proper amount of steam. Another advantage is that the plant can be shut down overnight or at times during the day and, when so shut down, does not require any fuel as is the case with a steam engine, which must be kept fired up in order to save the waste of time necessary to generate steam.

Having fully described our invention, what we claim is:

A diamond core drill comprising a frame having a narrowed front portion, an internal combustion engine carried by said narrowed portion, a vertically extending support carried by said frame adjacent its rear end, a gate carried by said support and extending beyond the rear end of said frame, a rotary feed spindle slidably carried by said gate, hydraulic feed cylinders carried by said gate, connections between said cylinders and the spindle whereby said spindle can be fed up and down, a second vertically extending support carried by said frame in advance of the first mentioned support, a rotary feed spindle driving mechanism carried by said supports, gearing carried by the driving mechanism and rotary feed spindle whereby the same are simultaneously rotated, a shaft extending centrally and longitudinally of said frame and driven by said engine, a connection between said shaft and rotary feed spindle driving mechanism for placing said mechanism in rotation, a clutch for connecting and disconnecting said shaft from the engine, a sludge pump carried by said frame, a variable speed mechanism carried by the frame and driven by said shaft for driving said sludge pump, a hydraulic feed pump carried by said frame, a second variable speed mechanism carried by said frame for driving said feed pump, and a clutch for placing said last mentioned speed mechanism in and out of operation.

In testimony whereof we have affixed our signatures.

FRED POWERS.
JOHN W. TOLLAND.